(12) United States Patent
Randall et al.

(10) Patent No.: US 9,367,644 B2
(45) Date of Patent: *Jun. 14, 2016

(54) OBJECT TREE WALKING

(75) Inventors: Craig Randall, Pleasanton, CA (US); Alex Rankov, Danville, CA (US); Oleg Bivol, Toronto (CA)

(73) Assignee: EMC Corporation, Hopkinton, MA (US)

( * ) Notice: Subject to any disclaimer, the term of this patent is extended or adjusted under 35 U.S.C. 154(b) by 1102 days.

This patent is subject to a terminal disclaimer.

(21) Appl. No.: 12/804,663

(22) Filed: Jul. 26, 2010

(65) Prior Publication Data

US 2010/0299357 A1 Nov. 25, 2010

Related U.S. Application Data

(63) Continuation of application No. 11/824,477, filed on Jun. 29, 2007, now Pat. No. 7,792,979.

(51) Int. Cl.
*G06F 17/30* (2006.01)
*G06Q 10/10* (2012.01)

(52) U.S. Cl.
CPC .......... *G06F 17/30961* (2013.01); *G06Q 10/10* (2013.01)

(58) Field of Classification Search
CPC .............. G06F 17/2785; G06F 17/289; G06F 17/30569; G06F 17/30893; G06F 17/2827; G06F 8/20; G06F 17/2211; G06F 17/2288; G06F 17/30011; G06F 17/30598; G06F 17/3064; G06F 17/30864; G06F 17/30873

USPC ......................................................... 707/769
See application file for complete search history.

(56) References Cited

U.S. PATENT DOCUMENTS

| | | | | |
|---|---|---|---|---|
| 7,987,491 B2* | 7/2011 | Reisman | ............ | G06F 17/30873 725/112 |
| 2003/0028500 A1* | 2/2003 | Jameson | ................ | G06N 5/022 706/45 |
| 2005/0149862 A1* | 7/2005 | Weitzman | ............. | G06F 17/218 715/248 |
| 2005/0288920 A1* | 12/2005 | Green | ................. | G06F 17/2785 704/3 |
| 2007/0061177 A1* | 3/2007 | Thieberger | ........... | G06Q 10/063 705/7.11 |
| 2008/0098453 A1* | 4/2008 | Hinton | .................... | H04L 63/20 726/1 |
| 2008/0126944 A1* | 5/2008 | Curtis | ............... | G06F 17/30896 715/733 |

* cited by examiner

*Primary Examiner* — Shyue Jiunn Hwa
(74) *Attorney, Agent, or Firm* — Van Pelt, Yi & James LLP

(57) ABSTRACT

Information is processed by receiving from a requesting node a request to access a content management related service. The content management related service is performed at a second node in the opposite direction as the requesting node; the request is associated with an object tree. The object tree is walked to obtain information associated with the object tree. A set of one or more service context rules associated with the content management related service is determined. The object tree is processed using the set of service context rules and the results of the processed object tree are made available to the content management related service so that the content management related service is able to properly operate at the second node.

18 Claims, 8 Drawing Sheets

OBJECT TREE WALKING

CROSS REFERENCE TO OTHER APPLICATIONS

This application is a continuation of U.S. patent application Ser. No. 11/824,477, entitled OBJECT TREE WALKING filed Jun. 29, 2007 now U.S. Pat. No. 7,792,979 which is incorporated herein by reference for all purposes.

BACKGROUND OF THE INVENTION

Some content management architectures have traditionally had a centralized architecture. However, new systems are being developed where content and/or services that operate on the content are distributed. For example, services may be located at a client that owns content and/or originates processing, at a content management server or a document repository, and/or at one or more intermediate nodes between the client and the content management server and/or repository. Oftentimes, a content management customer or a third party developer develops specialized services for a particular industry (e.g., for the banking industry, the medical industry, the shipping industry, etc.) or that implement enterprise specific rules or practices for a particular business (e.g., one business may have a different set of rules regarding accessibility of sensitive information compared to another business). New techniques that simplify the amount of work and/or reduce the difficulty for developers of services would be useful, particularly in content management systems with a distributed architecture.

BRIEF DESCRIPTION OF THE DRAWINGS

Various embodiments of the invention are disclosed in the following detailed description and the accompanying drawings.

DETAILED DESCRIPTION

Figure 1:
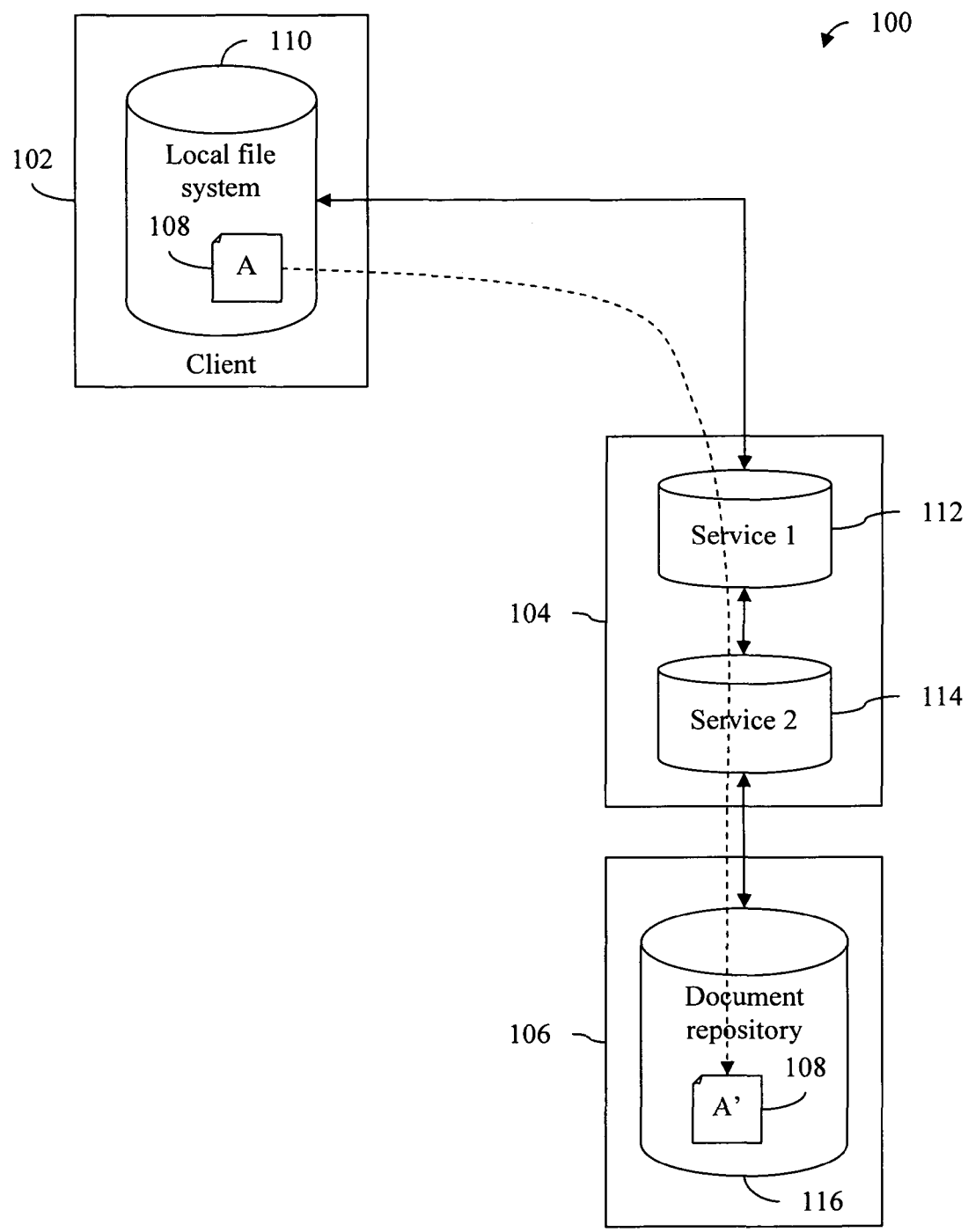
FIG. 1 is a diagram illustrating an embodiment of a system in which object tree walking is performed.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Walking an object tree and applying one or more service context related rules based on data determined by such walking is disclosed. In some embodiments, a request for a content management related service comprises or is otherwise related to an object tree. The object tree is walked and processed in accordance with one or more service context related rules. For example, in some embodiments the object tree is transformed, if and/or as required, to place it in a form required to perform a content management related service. Such transformation may include "patching" the tree, e.g., by replacing a path or other logical location provided by a sending node with a different path or other logical location required to perform the content management related service, for example a path on a receiving node at which the service is to be performed. In various embodiments, the object tree walking and associated processing are performed by a content management services runtime environment and/or system associated with a platform on which the content management related service is built and/or running, relieving a developer of a client side application that generated the object tree and/or an associated request and a developer of the service from the need to generate and/or process the request into a form required to perform the content management related service at a node at which it is to be performed.

FIG. 1 is a diagram illustrating an embodiment of a system in which object tree walking is performed. In the example shown, system 100 includes devices 102-106. In some cases, a device is referred to as a node. Devices 102-106 are physically separate devices; device 102 is connected to device 104 and device 104 is connected to device 106. In various embodiments, a variety of protocols and/or networks are used to connect devices 102-106 (e.g., storage area networks (SANs), Ethernet connections, Internet connections, etc.). In some embodiments, there is no intermediate device between a client and a device associated with a document repository (e.g., services 112 and 114 are included in client 102 and/or device 106). In some embodiments, all of the services or processing are performed by a single device.

As used herein, a service accesses or operates on information, such as content or metadata associated with document 102 and/or document 108. Although some services may be provided "out of the box" by a content management application/system provider, services as used herein refers to services that are developed by a content management customer (e.g., a tax preparation company, an import/export business, an electronics retailer, a government entity, etc.) or a third party developer. For example, there may not be an "off the shelf" software application and/or system configured to do exactly what a particular customer wants. A customer in such a situation may develop one or more services to manage and/or operate on information as desired. Services developed may, for example, reflect business rules or workflows that are industry specific and/or enterprise specific.

In this example, a document is sent from client 102 to document repository 106 and services are performed along the way. A document is any collection of content and/or associated metadata and is not limited to a word processing document (e.g., a PDF document or a Microsoft Word document). In some embodiments, a document is in Extensible Markup Language (XML) format. In this example, system 100 is a distributed system where information (e.g., content and/or associated metadata) and/or services are distributed throughout devices 102-106. For example, client 102 performs one set of services, services 112 and 114 on device 104 perform a second and third set of services (respectively), and device 106 performs a fourth set of services. In some configurations, a plurality of content management related services are distributed over a plurality of nodes and the plurality of services are to be performed with respect to an object tree or a request for one or more of the services.

In one example, system 100 is used by a hospital to manage patient medical records and treatment. Using client 102, a doctor writes a medical order for a particular patient (e.g., writing an order for the patient to be x-rayed, writing the patient a prescription, etc.). This medical order is received and processed by services 112 and 114. Service 112 may be associated with fulfilling the medical order, for example by scheduling time on a x-ray machine in the patient's name, sending a prescription to a pharmacist, updating the medical record with the medial order and/or fulfillment of the medical order, etc. Service 114 may be associated with billing or payment services. For example, once a doctor's medical order is fulfilled, service 114 may send a claims form to an insurance company, receive payment from the insurance company, and/or send a bill with any outstanding amount to a patient. Document repository 116 may be a central archive or repository where all branches of a medical clinic or hospital back up copies of patient medical records. Device 106 may perform services associated with archiving or storing, for example to ensure that patient medical records are maintained for a certain amount of time as required by law, offload medical records of former patients to other storage devices or media (e.g., to magnetic tape) if they are inactive for a certain amount of time, etc.

In another example, system 100 is used by a bank to manage and process loan applications. A loan application may be created at client 102, for example, a bank website configured to receive loan application information or a terminal at a local branch where a teller enters information from a paper application. Service 112 is responsible for obtaining a complete set of information for the loan application to be reviewed. For example, credit scores and/or credit reports for the individual applying for the loan are obtained and the loan application is augmented with this information. Service 114 is associated with obtaining approval for the loan application from the proper employees at the bank (e.g., a loan officer and/or her supervisor). Device 106 may perform services associated storing and/or exporting a loan contract. For example, a copy of the signed loan agreement may be stored by the bank, terms of the loan may be exported to a credit bureau, etc.

A technique for processing a request for a service associated with content management is disclosed. A request for a service in some embodiments is received in the form of an object tree. The object tree is walked and a service context set of rule's are applied as appropriate so that a downstream or subsequent service is able to properly operate. In some embodiments, a service context is a current value, state, or mode associated with a service. For example, a service may manage and update as needed service context information and this collection of information is used in some embodiments to determine or obtain an appropriate set of rules based on the service context.

By way of example, assume client 102 uses Microsoft Windows and document 108 is located at c:\foo\bar.txt in local file system 110. Service 114 on device 104 uses a Linux operating system and c:\foo\bar.txt may not be a valid or recognized file system location for service 114. A service context rule in this example is that a location must be specified with respect to the Linux file system associated with service 114 in order for a request to be properly processed by service 114. The location c:\foo\bar.txt is transformed to a location that is proper or relevant for service 114 and the results of this transformation (or more generally, the results of the rule based processing) are passed to service 114. In some cases, a service consumer (e.g., a client) provides a file stream but the service provider (e.g., a service) acts upon files on disk. In this case, the stream is written to disk so that the service can be applied. In another example, client 102 accepts multiple types of documents formats (e.g., Microsoft Word format and PDF format) but document repository 116 only accepts one type of document format (e.g., PDF format); a document is transformed from Microsoft Word format to PDF format if needed. For example, the object tree is walked, a content node is found and determined to be a Word format document, and a service context related rule results in the content being converted to PDF prior to being handed to the service.

The disclosed techniques are not necessarily limited to cases where a document or information is sent inbounds towards a document repository. In some embodiments, information is sent in the outbound direction away from a content repository. In some embodiments, a request for service in the inbound direction causes information to be returned in the outbound direction (e.g., a create request may return a link or identifier associated with the created item). In the outbound direction, services 112 and 114 are downstream services with respect to document repository 116 and rule based processing (if any) in that case is performed so that those downstream services are able to properly operate. In some embodiments, the techniques are used in an inbound-outbound (i.e., bi-directional) configuration.

Rule based processing of an object tree or information associated with an object tree is not necessarily limited to transformation or translation of data. In some embodiments, rule based processing includes supplementing information in an object tree with additional content or metadata that is required or necessary for a downstream or subsequent service to operate. For example, some identifier may be required by a downstream or subsequent service that an upstream or previous service may not necessarily be aware of and/or know how to obtain. In some embodiments, a new object or data structure is created, instantiated, or allocated. In some embodiments, an object or data structure must satisfy some rules regarding relationship or structure. In some embodiments, a process or service is performed, as needed, as part of rule based processing. For example, there may be some security or authorization processes that must be performed the first time a particular service is requested (e.g., for a given user or a given document). In some embodiments, a first set of data associated with an object tree or request is replaced with a second set of data required perform a content management related service.

In some cases, providing the techniques disclosed herein is attractive because a developer is not required to learn about the rules for another service (e.g., downstream or subsequent in some chain of services or devices). For example, without object tree walking, a service at client 102 might be required to obtain the rules for downstream services and ensure that a request originating from itself properly conforms. In some cases, flexibility in the configuration of a content management system is provided. For example, if a new device with one or more new services is added to the chain shown in system 100, the addition can be made without a service on client 102 having to necessarily discover or learn about the new service(s).

In various embodiments, the techniques are performed at various devices in system 100 (e.g., client 102, device 104, and/or device 106). In some embodiments, the techniques are performed by a content management runtime environment.

Figure 2:
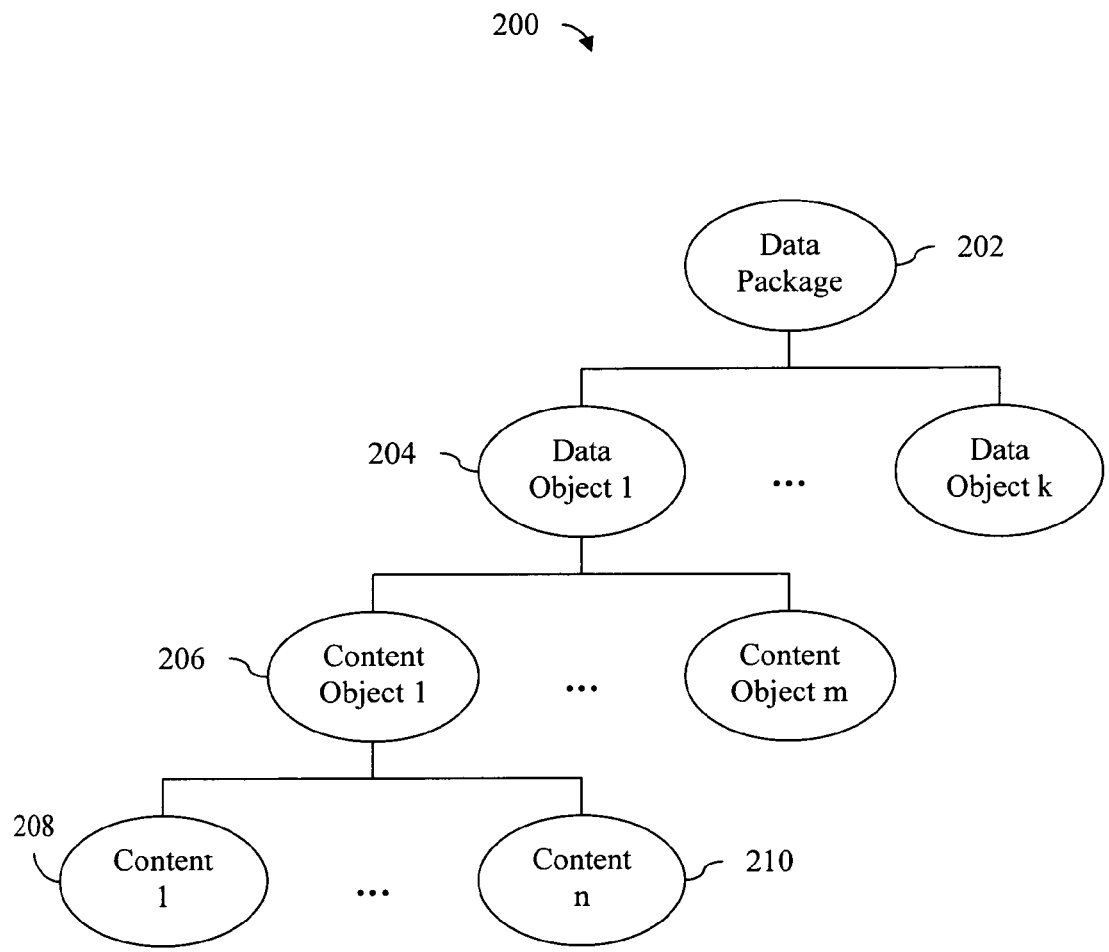
FIG. 2 is a diagram illustrating an embodiment of an object tree.

FIG. 2 is a diagram illustrating an embodiment of an object tree. In some embodiments, object tree 200 is exchanged between devices 102-106 in system 100 of FIG. 1. Object trees, such as object tree 200, are associated with requests for a content management service (e.g., a service on client 102, service 112, etc.).

In the example shown, object tree 200 has a tree structure. At the top level of object tree 200 is data package 202. Data package 202 in this example includes k data objects. Data object 204 includes m content objects, and content object 206 includes n pieces of content. In some embodiments, at least some of the n pieces of content include metadata.

Object tree 200 is walked and a service context specific set of rules are applied. For example, object tree 200 may be walked and by examining content 208 it is determined whether information is associated with a file or a Uniform Resource Locator (URL) (i.e., streaming type content). A rule may be to have content of one type (e.g., file or URL) and if needed the content is processed. In some embodiments, a rule is with respect to a permitted relationship (e.g., between data objects, between content objects, etc.). In some embodiments, a rule is with respect to a value or range of values of the n pieces of content.

In some embodiments, a data object (e.g., data object 204) is a generalized representation of a persistent object. In some embodiments, a data object has associated with it an object identity, such as an ID, a path, and/or a query based qualification. In some embodiments, a data object has a type, such as a document, a folder, etc. In some embodiments, a data object contains metadata, such as a set of properties. In some embodiments, a data object includes content (e.g., for multiple files or multiple versions/renditions of a file). In some embodiments, a data object has a relationship with respect to one or more other data objects (e.g., a parent folder).

Data object 200 is used to store or represent a variety of collections of information in various embodiments. In some embodiments, data object 200 is used to represent an entire file system where, for example, the top data objects immediately below data package 202 are folders (e.g., a folder having subfolders and/or files). Using a single object tree and/or single data package to represent an entire file system is attractive in some cases because the entire file system is able to be imported or retrieved in a single operation.

Figure 3:
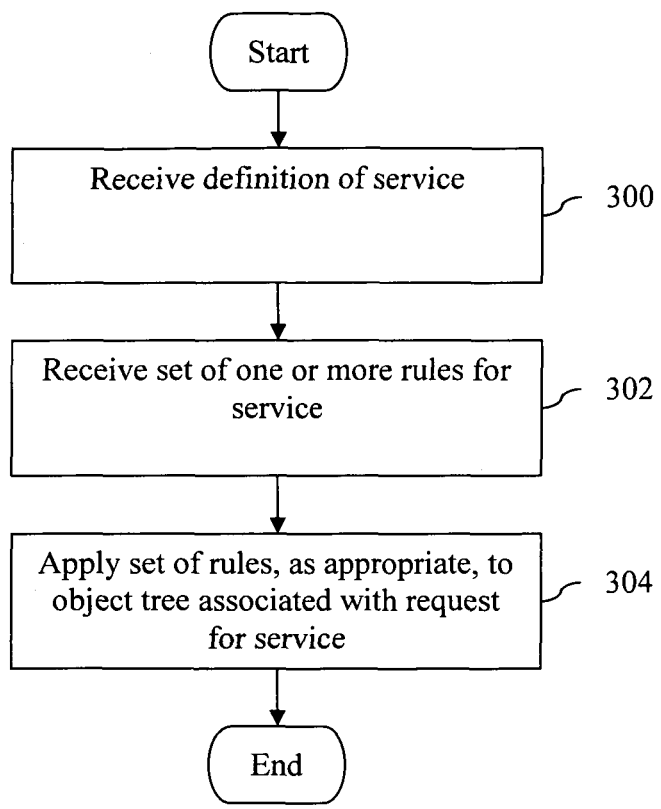
FIG. 3 is a flowchart illustrating an embodiment of a process for obtaining information used in object tree walking.

FIG. 3 is a flowchart illustrating an embodiment of a process for obtaining information used in object tree walking. In some embodiments, at least some portion of the example process is performed by a runtime environment associated with a content management system (e.g., EMC's Documentum Foundation Services (DFS) runtime environment).

At 300, a definition of a service is received. In some embodiments, information is received from a customer or third party developer. A set of one or more rules for a service are received at 302. In some embodiments, the set of rules received at 302 comprise all rules for that service.

At 304, the set of rules are applied, as appropriate, to an object tree associated with a request for service. For example, the rules received at 302 are accessed and appropriate rules (e.g., based on the service context) are applied.

In one example, a service is built for the EMC DFS runtime environment. DFS tools are used to generate artifacts. Some examples include Web Services Description Language (WSDL), proxies (e.g., local or SOAP), or a Java client library. Generated Java client classes are used to build tests; in some cases an in process API is built first for simplicity. The application is packaged (e.g., a WAR/EAR application) using the DFS tools and WSDL validation is performed with non Java clients.

Figure 4:
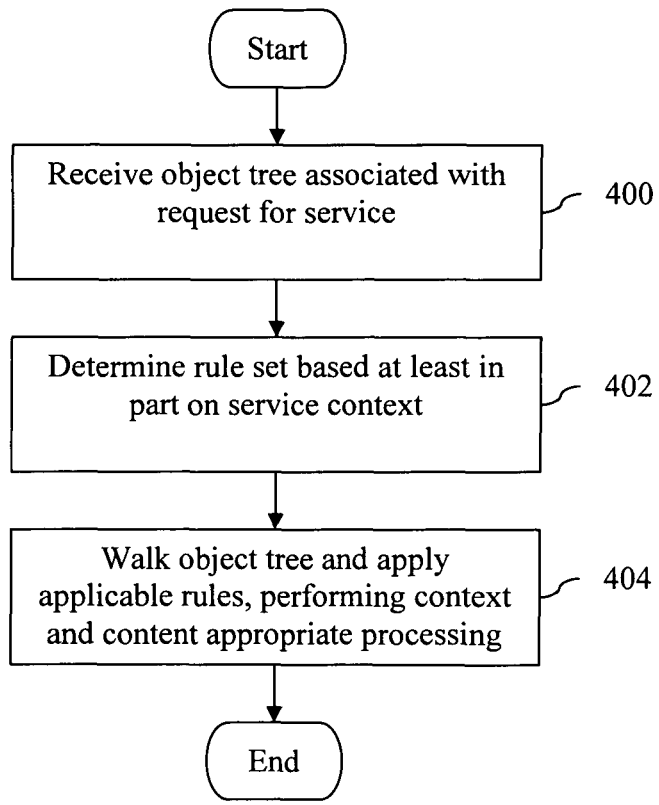
FIG. 4 is a flowchart illustrating an embodiment of a process for walking an object tree and performing rule based processing.

FIG. 4 is a flowchart illustrating an embodiment of a process for walking an object tree and performing rule based processing. In some embodiments, step 304 of FIG. 3 is performed using the example process. In some embodiments, the example process is performed by a runtime environment, for example so that a developer does not necessarily have to ensure that requests for service(s) satisfy rules associated with the requested services.

At 400, an object tree associated with a request for a service is received. At 402, a rule set is determined based at least in part on service context. In some embodiments, a service stores or manages context related information and this collection of information is accessed to determine service context. In some embodiments, a collection of rules for a service is accessed (e.g., received at step 302 of FIG. 3) and those appropriate for the service context are determined.

At 404, an object tree is walked and applicable rules are applied; context and content appropriate processing is performed. In various embodiments, steps 404 is performed before step 402, or steps 402 and 404 are combined.

Figure 5:
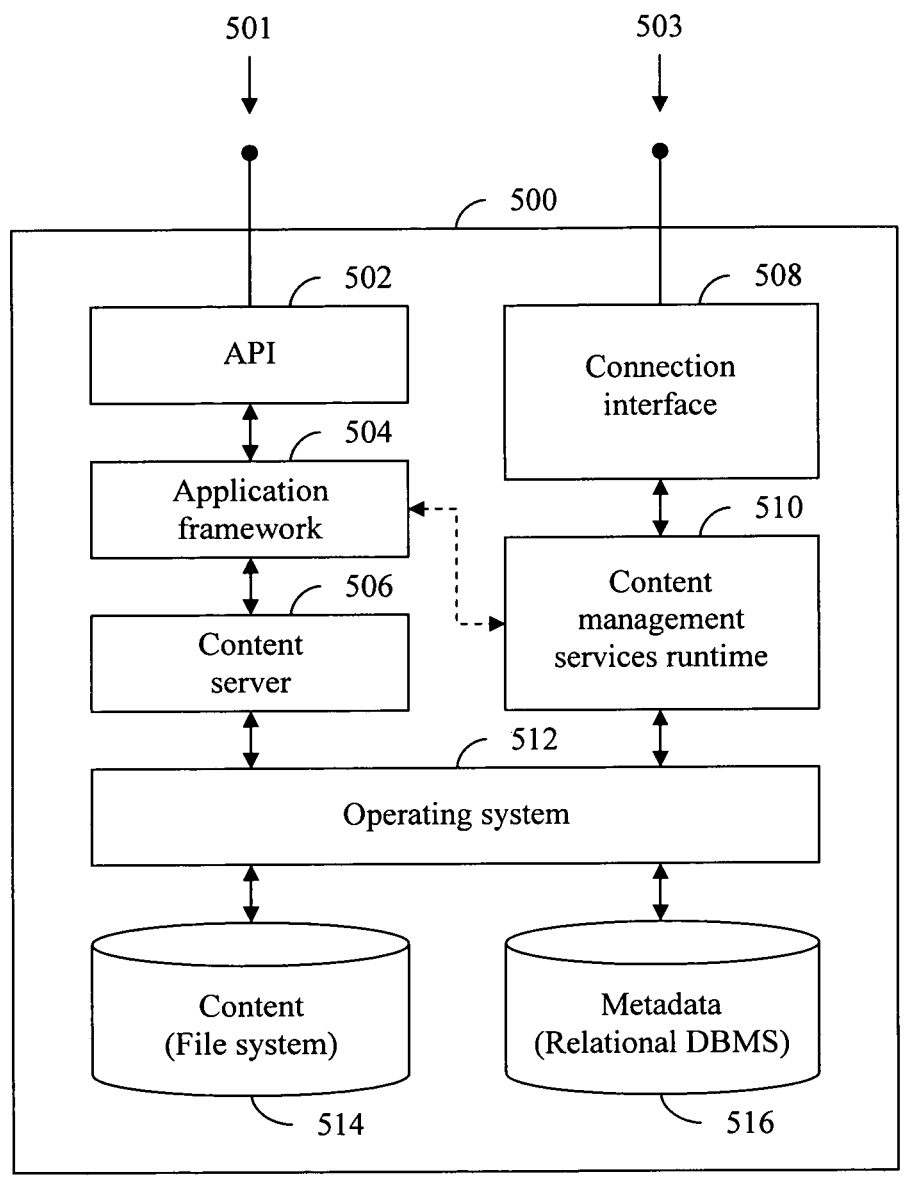
FIG. 5 is a diagram illustrating an embodiment of a node configured to perform a content management service.

FIG. 5 is a diagram illustrating an embodiment of a node configured to perform a content management service. In the example shown, node 500 has two paths to access content and metadata. In the example shown, content is stored on file system 514. Metadata associated with the content is stored in relational database management system (DBMS) 516. For example, if node 500 is part of a retailer's system, the content may include product and pricing information and metadata may include relationship information (e.g., to create an association between versions 1.0 and 2.0 of a particular product, between different configurations of a product, etc.). In this example, content and metadata information are accessed through-operating system 512.

Access path 501 to content and metadata includes application programming interface (API) 502, application framework 504, and content server 506 (which is coupled to operating system 512). In this example, access path 501 is a legacy access path. Using access path 501, developers must be aware of service rules and ensure that requests for services that access and/or manipulate content and/or metadata conform to those rules.

Content and metadata are able to be accessed, if so desired, through access path 503 which includes connection interface 508 and content management service runtime 510. In some embodiments, access path 503 is associated with SOAP and/or web services. In this example, content management services runtime 510 is configured to perform object tree walking, process a request according to a set of rules. In some embodiments, content management services runtime 510 accesses content and/or metadata via application framework 504.

In some cases, having access paths 501 and 503 is attractive because older services that were developed using a legacy access path can still be used while new services that use a newer access path are able to be developed in faster and/or more convenient manner. For example, some customers or third party developers prefer to develop new services that access and/or manipulate content and/or metadata via access path 503.

Figure 6:
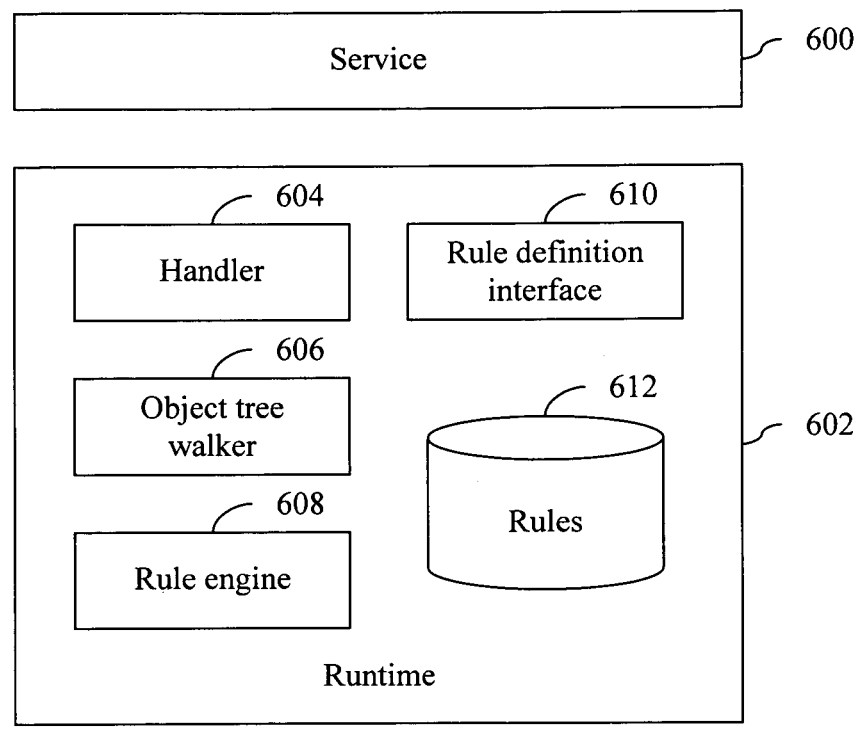
FIG. 6 is a diagram illustrating an embodiment of a runtime environment configured to perform object tree walking and rules based processing.

FIG. 6 is a diagram illustrating an embodiment of a runtime environment configured to perform object tree walking and rules based processing. In the example shown, developers are not required to generate requests for service 600 that are (e.g., fully) compliant with rules 612. Runtime 602 processes a request received as an object tree and performs appropriate processing as necessary for the request to be performed by service 600.

Runtime 602 includes handler 604, object tree walker 606, rule engine 608, rule definition interface 610, and rules 612. In this example, rules 612 is provided by the developer of service 600 using rule definition interface 610. Handler 604, object tree walker 606, rule engine 608, and rule definition interface 610 in this example is provided by a content management application provider.

Object tree walker 606 walks a received object tree (not shown) associated with a request for service 600. For example, the structure of object tree 200 or information (e.g., data and/or metadata) stored in object tree 200 is extracted during the walking process. Rule engine 608 accesses rules 612 and determines the service context rules that are applicable (e.g., by comparing information output by object tree walker 606 with rules 612). Rule engine 608 drives, controls, or otherwise directs handler 604 to perform the processing necessary for service 600 to operate properly. Once processing is completed by handler 604, results (if any) are passed to service 600.

Figure 7A:
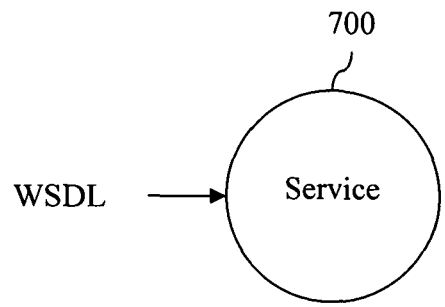
FIG. 7A is a diagram illustrating an example of a service configured to support WSDL.
Figure 7B:
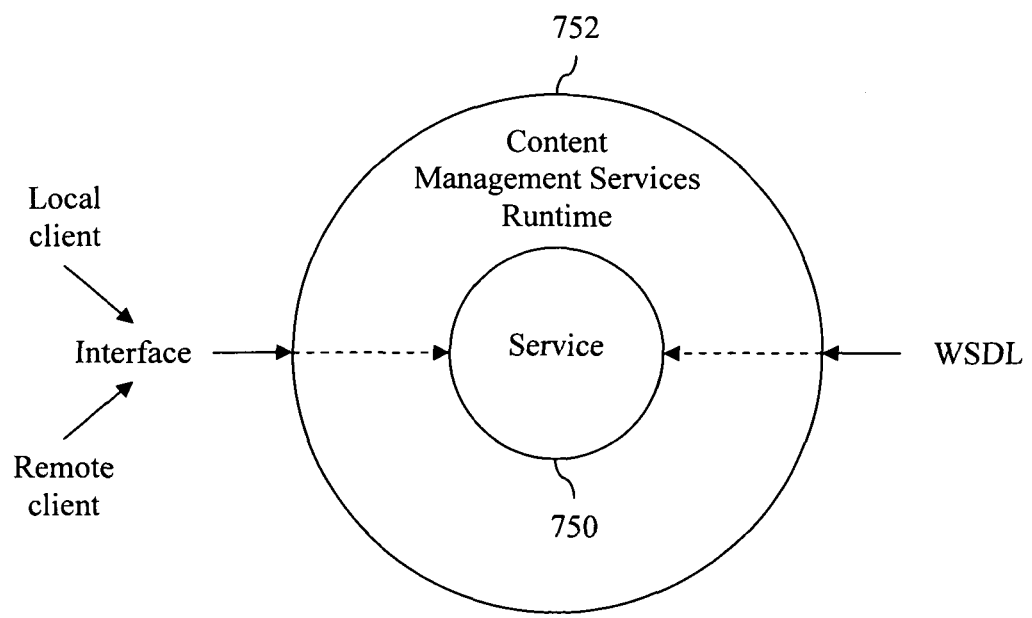
FIG. 7B is a diagram illustrating an embodiment of a service operating in association with a content management services runtime.

FIG. 7A is a diagram illustrating an example of a service configured to support WSDL. FIG. 7B is a diagram illustrating an embodiment of a service operating in association with a content management services runtime. In the examples shown, service 750 is enveloped by content management services runtime 752, which is configured to perform object tree walking and rule based processing as appropriate. Service 750 is accessible through an interface for both local clients (i.e., on the same device) as well as remote clients (i.e., on another device). Access to service 750 is also available via WSDL.

In contrast, service 700 is not associated with a content management services runtime. In that example, a developer may be required to ensure that a request for service 700 conforms to a set of associated rules. Access to service 700 is available via WSDL.

Figure 8A:
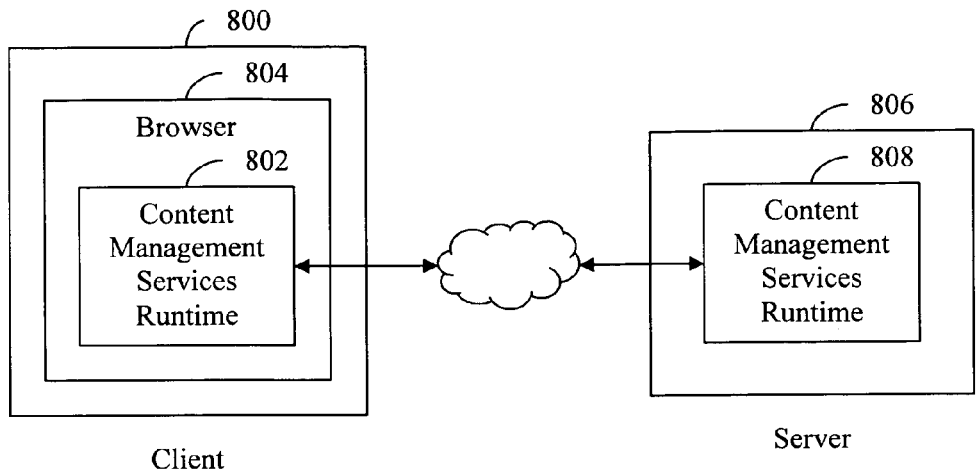
FIG. 8A is a diagram illustrating an embodiment of a content management services runtime on a client node and a server node.

FIG. 8A is a diagram illustrating an embodiment of a content management services runtime on a client node and a server node. In the example shown, content management services runtime 802 and 808 are configured to perform object tree walking and rule based processing as appropriate. In the example shown, at client 800, browser 804 includes content management services runtime 802. For example, content management services runtime 802 may be configured to communicate via browser 804 and/or as part of browser 804.

Figure 8B:
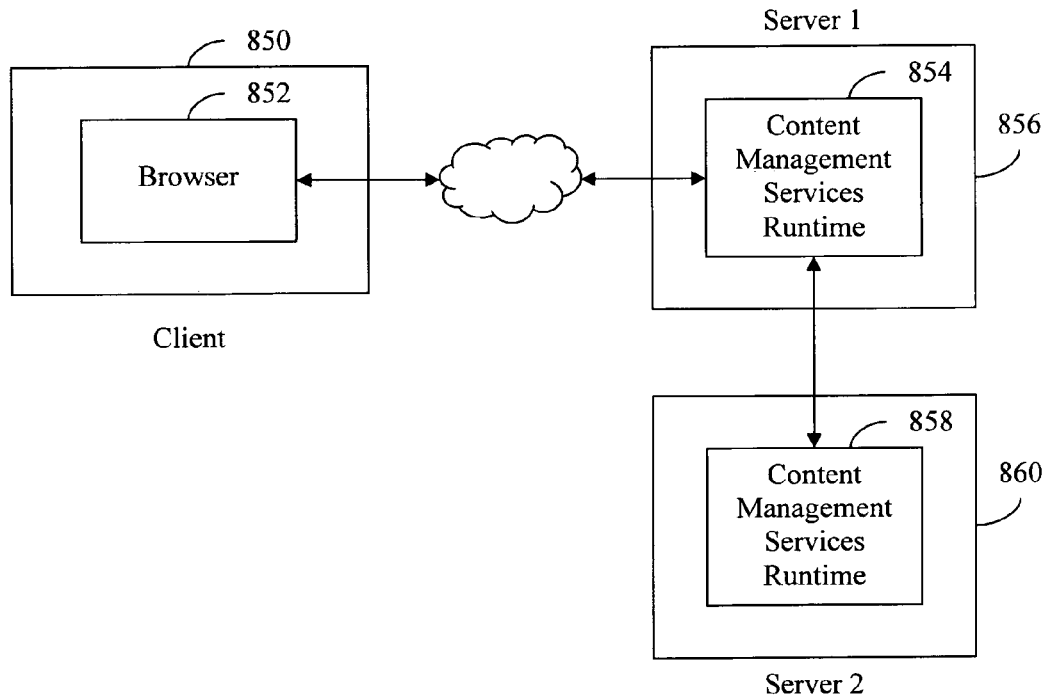
FIG. 8B is a diagram illustrating an embodiment of content management services runtimes configured to run on server nodes.

FIG. 8B is a diagram illustrating an embodiment of content management services runtimes configured to run on server nodes. In this example, client 850 includes browser 852 but does not includes a content management services runtime. Servers 856 and 860 include content management services runtimes 854 and 858, respectively. Content management services runtimes 854 and 858 are configured in this example to perform object tree walking and rule based processing. In this example, object tree walking and rule based processing are not performed at a client node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing information, comprising:
receiving, from a requesting node, a request to access a content management related service associated with a second node, wherein the request is associated with an object tree which includes a plurality of objects having a hierarchical relationship;
walking the object tree to obtain information associated with the object tree;
determining a set of one or more service context rules associated with the content management related service, wherein the set of service context rules specifies a proper structure of the object tree in order for the content management related service to properly operate;
using a hardware processor to process the object tree using the set of service context rules, including by transforming the structure of the object tree so that the transformed structure of the object tree satisfies the set of service context rules, wherein transforming the structure includes changing a relationship between at least some of the objects in the object tree; and
making the results of the processed object tree available to the content management related service on the second node.

2. The method recited in claim 1, wherein the content management related service comprises one of a plurality of content management related services, distributed over a plurality of nodes, which are to be performed with respect to the object tree.

3. The method recited in claim 1, wherein the content management related service is developed by one or more of the following: a third party developer or a content management customer.

4. The method recited in claim 1, wherein determining is based at least in part on one or more of the following: the structure of the object tree obtained during walking, data stored in the object tree obtained during walking, or metadata stored in the object tree obtained during walking.

5. The method recited in claim 1, wherein the additional information includes metadata.

6. The method recited in claim 1, wherein processing further includes replacing a first data associated with the object tree with a second data required to perform the content management related service at the second node.

7. The method recited in claim 1, wherein processing further includes performing a security related process required to perform the content management related service at the second node.

8. The method recited in claim 1, wherein transforming the structure includes changing the number of objects in the object tree.

9. A system for processing information, comprising:
a processor; and
a memory coupled with the processor, wherein the memory is configured to provide the processor with instructions which when executed cause the processor to:
receive, from a requesting node, a request to access a content management related service associated with a second node, wherein the request is associated with an object tree which includes a plurality of objects having a hierarchical relationship;
walk the object tree to obtain information associated with the object tree;
determine a set of one or more service context rules associated with the content management related service, wherein the set of service context rules specifies a proper structure of the object tree in order for the content management related service to properly operate;
process the object tree using the set of service context rules, including by transforming the structure of the object tree so that the transformed structure of the object tree satisfies the set of service context rules, wherein the instructions for transforming the structure include instructions for changing a relationship between at least some of the objects in the object tree; and
make the results of the processed object tree available to the content management related service on the second node.

10. The system recited in claim 9, wherein determining is based at least in part on one or more of the following: the structure of the object tree obtained during walking, data stored in the object tree obtained during walking, or metadata stored in the object tree obtained during walking.

11. The system recited in claim 9, wherein processing further includes replacing a first data associated with the object tree with a second data required to perform the content management related service at the second node.

12. The system recited in claim 9, wherein processing further includes performing a security related process required to perform the content management related service at the second node.

13. The system recited in claim 9, wherein the instructions for transforming the structure include instructions for changing the number of objects in the object tree.

14. A computer program product for processing information, the computer program product being embodied in a non-transitory computer readable storage medium and comprising computer instructions for:
receiving, from a requesting node, a request to access a content management related service associated with a second node, wherein the request is associated with an object tree which includes a plurality of objects having a hierarchical relationship;
walking the object tree to obtain information associated with the object tree;
determining a set of one or more service context rules associated with the content management related service, wherein the set of service context rules specifies a proper structure of the object tree in order for the content management related service to properly operate;
processing the object tree using the set of service context rules, including by transforming the structure of the object tree so that the transformed structure of the object tree satisfies the set of service context rules, wherein the computer instructions for transforming the structure include computer instructions for changing a relationship between at least some of the objects in the object tree; and
making the results of the processed object tree available to the content management related service on the second node.

15. The computer program product recited in claim 14, wherein determining is based at least in part on one or more of the following: the structure of the object tree obtained during walking, data stored in the object tree obtained during walking, or metadata stored in the object tree obtained during walking.

16. The computer program product recited in claim 14, wherein processing further includes replacing a first data associated with the object tree with a second data required to perform the content management related service at the second node.

17. The computer program product recited in claim 14, wherein processing further includes performing a security related process required to perform the content management related service at the second node.

18. The computer program product recited in claim 14, wherein the computer instructions for transforming the structure include computer instructions for changing the number of objects in the object tree.

* * * * *